UNITED STATES PATENT OFFICE.

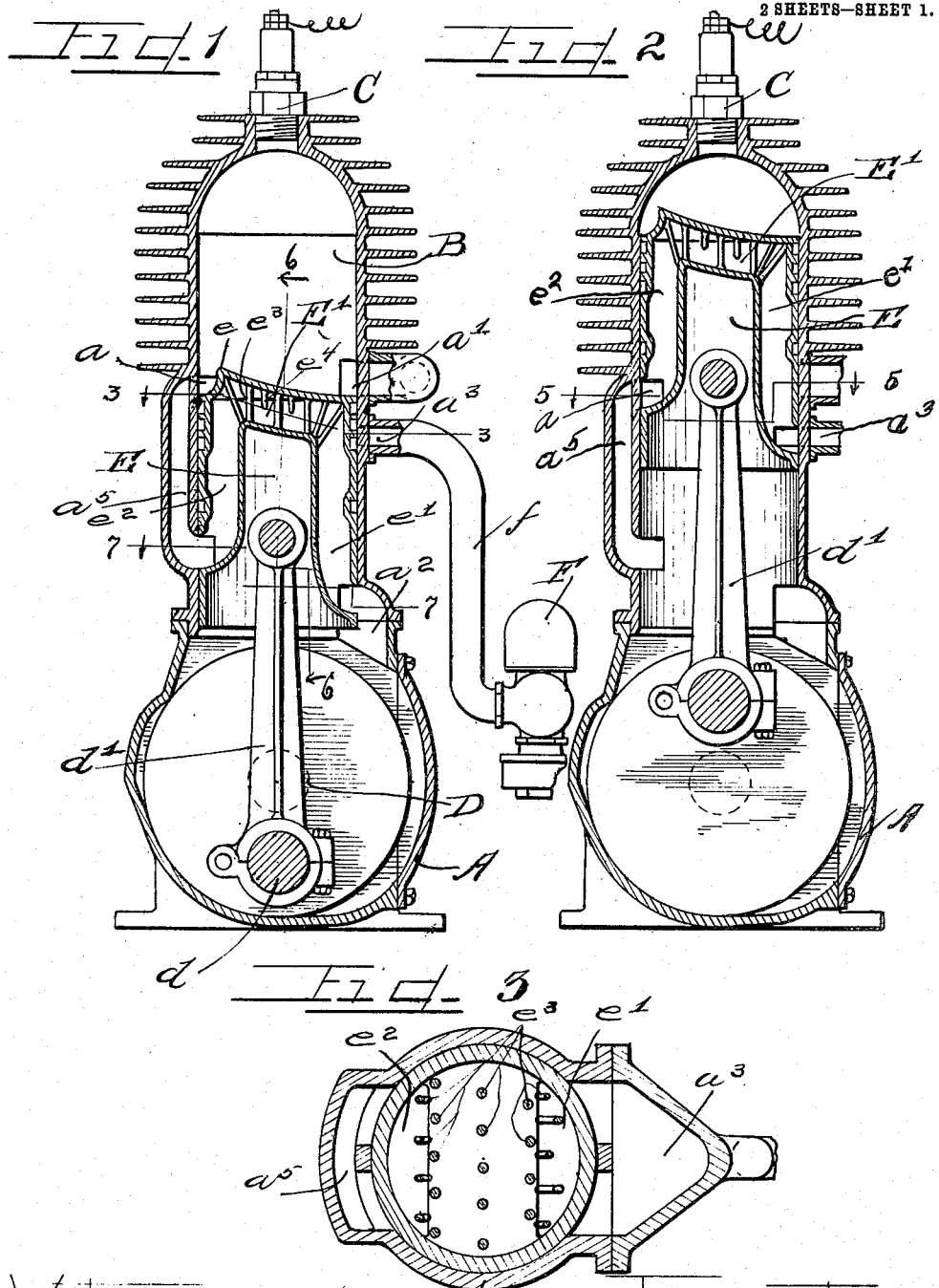

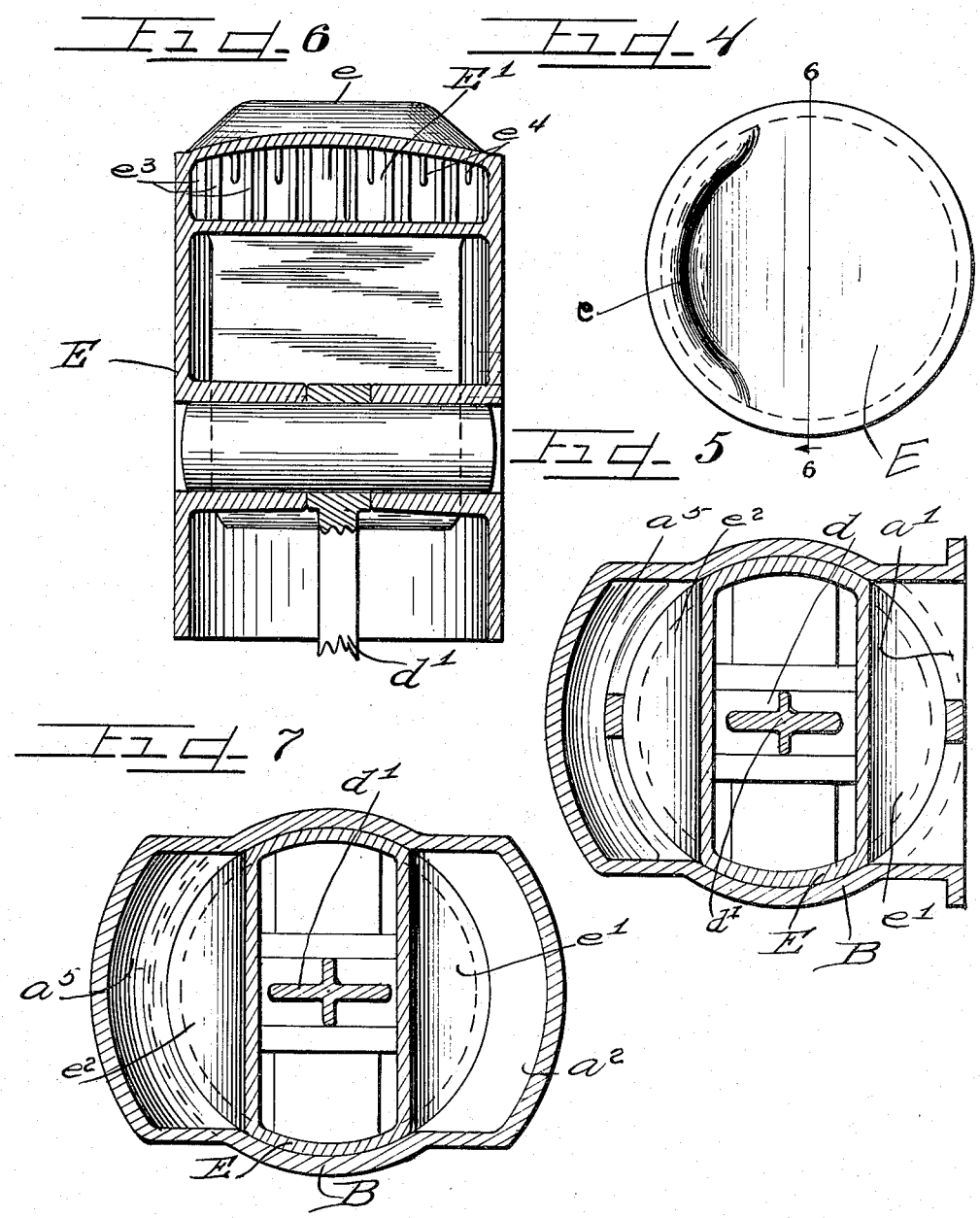

JOHN D. HAY, OF CHICAGO, ILLINOIS, ASSIGNOR OF ONE-HALF TO WILLIAM R. DONALDSON, OF CHICAGO, ILLINOIS.

EXPLOSIVE-ENGINE.

942,140. Specification of Letters Patent. Patented Dec. 7, 1909.

Application filed November 2, 1906. Serial No. 341,720.

*To all whom it may concern:*

Be it known that I, JOHN D. HAY, a citizen of the United States, and a resident of the city of Chicago, in the county of Cook and State of Illinois, have invented certain new and useful Improvements in Explosive-Engines; and I do hereby declare that the following is a full, clear, and exact description of the same, reference being had to the accompanying drawings, and to the letters of reference marked thereon, which form a part of this specification.

This invention relates to improvements in explosive engines, and more particularly to an internally cooled explosive engine of that class set forth in my prior patent for "explosive engines", No. 880,024, issued February 25th, 1908.

Heretofore it has been usual with manufacturers of explosive engines to attempt to maintain the desired temperature in the cylinder and piston, by external cooling means. In some instances water jackets are used in which either water or other cooling medium is circulated or the cylinders are provided with external pins, fins or flanges, which are exposed to the atmosphere and are usually subjected to a strong draft of air from a fan or blower endeavoring to convey the heat away by radiation and convection sufficiently to maintain the temperature low enough to enable the device to operate. In all such engines, however, a very serious difficulty presents itself, namely, unless the cylinder is kept cool enough the compression of the mixture prior to explosion must be sufficiently low to prevent the charge exploding before the compression is complete. It is for this reason that air cooled engines compress to about one-half the pressure of a water-jacketed engine. Furthermore the high temperatures necessitate the use of much more oil, often carbonizing the same in the cylinder and making the engine unreliable, and in all cases causing smoke. Water jacketing also presents objections, particularly for automobile and transportation purposes owing to the necessity of carrying water and the difficulty of sufficiently circulating the same to maintain efficiency, and of course leaking joints sometimes permit the water to escape, when the heat quickly ruins the engine. Obviously, too, inasmuch as the piston must perform the severe labor of compression, it is heated by the pressure when compressing the mixture, as well as by the intense heat of the combustion. Furthermore, the friction due to its rapid travel in the cylinder has a decided heating effect. For these reasons, the cooling of the piston should receive very careful attention, and it is evident that the piston in engines cooled as heretofore described, must necessarily be always the hottest part of the engine.

With this in view the object of my invention is to provide an engine in which the cylinder and piston are internally cooled, and in which, if desired also the cylinder may be externally cooled in any preferred or suitable manner.

It is a further important object of my invention to provide an engine in which the piston is cooled by the flow of a cooling fluid therethrough.

It is an important object also, of this invention to cool the piston of the engine and thereby the cylinder by conducting the explosive mixture or vapor through the piston to the compression chamber thence discharging the same to the cylinder for compression and explosion.

It is a further object of the invention to embody in a two cycle engine of the class described (which may or may not be provided with external cooling means), a piston through which the explosive mixture flows to the compression chambers and through which also the explosive mixture flows from the compression chamber, into the cylinder, thus conducting the cooling and highly expansive vapor twice through the piston at each revolution of the shaft, thereby cooling because of such flow of gas or vapor therethrough, to or below normal outside temperatures and also cooling because of the expansion of the gases drawn into the partial vacuum in the crank chamber and cylinder.

It is a further object of the invention to afford within the piston of an engine of the class described a chamber having radiating projections therein increasing the area of hot metal exposed to the indrawn cold vapor.

Finally it is an object of my invention to cool an engine of the class described internally by conducting a cooling fluid twice during each rotation of the crank through a chamber in the head of the piston, the walls of which adjacent the combustion chamber are very thin and into which project radiating projections thus bringing the cooling gas in contact with a very large radiating area.

The invention consists in the matters hereinafter described and more fully pointed out and defined in the appended claims.

On the drawings: Figure 1 is a central vertical section of a device embodying my invention, showing the piston at the end of the power stroke. Fig. 2 is a similar view showing the piston at explosion position. Fig. 3 is a section taken on line 3—3 of Fig. 1. Fig. 4 is an enlarged top plan view of the piston. Fig. 5 is a section taken on line 5—5 of Fig. 2. Fig. 6 is a section taken on line 6—6 of Figs. 1 and 4. Fig. 7 is a section taken on line 7—7 of Fig. 1.

As shown in the drawings: A, indicates the crank case, of the engine which, as shown, is closed and adapted for use as a compression chamber. The cylinder B connected on the crank case as shown is provided with radiating ribs or fins for air cooling and a spark plug C adapted for use in jump spark ignition is secured in the top thereof. Within said crank case is the crank shaft D, and crank pin $d$ as usual. A piston rod $d'$, connects said crank pin $d$ with the piston E, in the usual manner. Said piston E, as shown, is provided at its inner end at the side adjacent the inlet port $a$ with a raised rib $e$, as is usual with two cycle engines, affording a somewhat abrupt shoulder adjacent said inlet port of the cylinder to deflect the inflowing vapor upwardly, and inclines gradually toward the opposite side of the cylinder in which is the exhaust port $a'$, which is opened by the piston, a brief interval before the inlet port is opened thus permitting the exhaust gases to escape before the inlet is fully opened. Said piston, as shown, is cored in its upper end or head to afford a chamber E' beneath as nearly as practicable the entire surface of said piston head. Projecting downwardly in said chamber and connecting the upper thin wall and bottom wall thereof as shown, are braces, fins or pins $e^3$, and also shorter braces, fins or pins $e^4$, which are integral with the upper relatively thin wall, of the chamber or that exposed to the heat of combustion. Extending downwardly from said chamber on the inlet side of the cylinder is a broad passage $e'$, cored in the piston, which extends to near the lower end thereof and opens thence through the side of the piston to register with a port $a^2$ opening into the crank case when at the end of the power stroke and registering with a port $a^3$, in which the pipe $f$ from the carbureter F, communicates, as shown in Fig. 2, when at ignition position. A cored passage $e^2$, in the opposite side of the piston communicates with the chamber in the head and opens also through the side of the piston near its lower end and communicates with a passage $a^5$ in the cylinder which leads from the inlet port $a$, downwardly and opens through the side of the cylinder below the lower end of the piston when in the ignition position, and which registers with the port at the lower end of the passage $e^2$, when the piston is at or near the end of its power stroke.

From the construction described it is evident that the mixture flows into the piston through the port $a^3$ thence through the chamber in the piston head, and into the crank case through the passages $e^2$ and $a^5$ filling the crank case for compression. The compressed mixture flows from the crank case upwardly through the passage $e'$ at the end of the power stroke, through the chamber and the passage $e^2$, and into the passage $a^5$, then through the inlet port $a$, into the cylinder.

The operation is as follows: At the end of the power movement of the piston the exhaust port $a'$, opens permitting the escape of gases of combustion. Shortly thereafter and approximately the moment the port in the lower end of the passage $e'$, in the piston opens into the crank case, as shown in Fig. 1, the compressed mixture in the crank case flows upwardly, through said passage and the chamber E', in the head of the piston, cooling the piston and thence downwardly through the passage $e^2$, into the passage $a^5$, in the cylinder and thence upwardly through the said passage and the inlet ports $a$, into the cylinder, scouring the cylinder and filling the same with the explosive mixture preliminary to the compression, which of course immediately follows as the piston rises, and closes the inlet and the exhaust ports. As the piston approaches ignition position, as shown in Fig. 2, the inlet port $a^3$, to the crank case has been opened by said upward movement and the pressure within the crank case having been reduced below atmospheric pressure, by the delivery of the charge to the cylinder and the increased capacity due to the rising of the piston, the vapor from the carbureter flows upwardly through the pipe $f$, again filling the crank case to atmospheric pressure through the passage $e'$, the chamber E', and the passages $e^2$ and $a^5$. The descending piston again compresses the mixture in the crank case during its power stroke until the port $e'$, again opens into the crank case, as shown in Figs. 1 and 7, when the operation is repeated. Thus at the end of each power stroke of the engine, a cooling gas flows through the chamber E' in the piston and at the ignition position a charge flows therethrough to the crank case thus twice sending a cooling current through the same with each rotation of the crank shaft. Obviously, when flowing to the cylinder the gas is under considerable pressure, and by its expansion acts with even more efficiency as a cooling agent. When first drawn into the piston from the carbureter the drops or sprays of gasolene or other hydrocarbon vapor therein, coming in contact with the somewhat heated head of the piston, in said chamber E', and the pins and webs therein, by sudden expansion and vaporization act with great cooling effect and much more efficiently than could be possible with a current of atmospheric air. Considerable advantage is also derived of course from the perfect mixture of the gases and complete vaporization due to the double flow through the said passages and chamber, requiring less mixture than the usual charge therefor.

Of course, an engine such as described may be provided with any number of cylinders, though for convenience a single cylinder is illustrated, and of course, the cylinder if desired can be provided with any external cooling means, though inasmuch as the cylinder is well cooled internally very little attention need be paid to any external cooling means.

Many changes may be made without departing from the principles of this invention and I therefore do not desire to limit this application for patent as to detail or otherwise than necessitated by the prior art.

I claim as my invention:

1. In an explosive engine a crank case, a cylinder secured thereto, a piston in the cylinder containing a chamber in its head and exposing a relatively thin wall to the combustion of the charge, said piston provided with passages on opposite sides thereof, the lower ends of which open outwardly through the wall of the piston, a plurality of ports on opposite sides of the cylinder, one adapted to admit the explosive mixture into one of the passages in the piston at the outer limit of movement of the piston, a passage connecting the ports on the opposite side of the cylinder from said admission port, adapted to admit the explosive mixture from the piston to the crank case and means for admitting the explosive mixture in the crank case into one of the passages in the piston for admission into the combustion chamber in the cylinder.

2. In an explosive engine a piston containing a transverse chamber in its head lying close to the combustion surface of the piston and having passages opening therein at one end on opposite sides of the piston, said passages opening downwardly and outwardly through the sides of the piston only at the lower ends thereof, and pins extending across the chamber and connecting opposite walls.

3. In an explosive engine, a crank case, a cylinder secured thereto, a piston containing a chamber, passages terminating at one end in the chamber and extending downwardly and ported through the sides of the piston, inlet ports, one for the crank case and one for the cylinder, adapted to communicate at different times with one of the passages and connected by a passage through which and the piston the explosive fluid flows at the end of each stroke of the piston, and ports, one opening through the cylinder and one opening from the crank case adapted to communicate at different times with the other passage in the piston.

4. A piston for the purposes specified having a chamber in its head affording an upper thin wall exposed to the combustion of the charge and a lower thin wall, passages leading from the chamber and ported outwardly through the sides of the piston near its lower end, and mixing and radiating fins or pins integral with the walls of the chamber in the head of the piston.

5. In an explosive engine a crank case, a cylinder secured thereto, oppositely disposed inlet ports in the cylinder, a piston in said cylinder having a continuous passage leading from the lower end of the piston on one side thereof upwardly beneath the head and extending downwardly on the opposite side of the piston, said passage only at the lower ends opening through the sides of the piston and adapted to register with the oppositely disposed inlet ports to admit the explosive fluid therethrough, and a passage leading downwardly from one of said inlet ports adapted to open into the lower end of the cylinder when the piston is at its upper limit of movement admitting the explosive mixture into the crank case for initial compression.

6. In a device of the class described the combination with a cylinder and crank case of oppositely disposed ports opening through the side of the cylinder, a piston having a chamber in the head and passages extending downwardly therefrom adapted to register simultaneously with the ports and admit the explosive mixture therethrough from one port to the other, a passage leading from the last named port adapted to communicate with the crank case when the ports are communicating to admit the explosive fluid thereinto, said piston adapted at its opposite limit of movement to close one of the inlet ports, and one of the passages in the piston adapted in this position to communicate with the crank case to reverse the flow of explosive fluid into the combustion chamber in the cylinder.

7. In an engine a piston having a chamber in its head and exposing a thin wall to the combustion of the charge, pins extending across the chamber connecting the opposite walls to increase the surface exposed within said chamber, passages extending downwardly from the chamber on opposite sides thereof opening only at their lower ends outwardly through the sides of the piston, a cylinder, and ports opening from the opposite sides of the cylinder to said passages and through which the explosive medium is delivered through the piston.

8. A hollow piston having a chamber in its head and passages, each at one end communicating with the chamber and extending downwardly and opening through the sides of the piston only at the extreme lower ends of the passages, and mixing and radiating projections or pins in said chamber.

9. A piston having a mixing chamber therein and opposite passages communicating therewith and extending downwardly through the wall of the piston having external communication only at the lower extremities of the passages, and radiating means in the chamber adapted also to mix fluid.

10. In a device of the class described the combination with a crank case and cylinder of a piston in the cylinder having a chamber in its head, passages extending downwardly therefrom to near the lower end of the piston and ported through the sides of the piston only at their lower extremities, ports on diametrically opposite sides of the cylinder, one port communicating with a source of explosive mixture, and the other port opening into the explosion chamber when the piston is at its lowest limit of movement and both of said ports adapted to communicate at times with the passages, a passage extending through a wall of the cylinder and affording communication between one of the ports and the crank case at the upper limit of movement of the piston, permitting the explosive mixture to flow through all of the ports and passages into the crank case, and at the lower limit of movement of the piston one of the passages in the piston being adapted to communicate with the passage in the cylinder and the other with the crank case necessitating the explosive fluid to again flow through all of said passages to the combustion chamber in the cylinder.

11. In a two cycle engine the combination with a carbureter of a cylinder having oppositely disposed inlet and exhaust ports positioned to open at the limit of the power stroke, a passage leading downwardly from the inlet port to near the crank case and opening inwardly through the cylinder, an inlet port opening through the walls of the cylinder below the exhaust port, a piston reciprocating in said cylinder and having a chambered head exposing a thin wall to the combustion chamber and having downwardly cored passages, one on each side thereof ported through the side of said piston near its lower end and adapted to register on opposite sides at the lower limit of movement of the piston, in the crank case and with the passage in the cylinder, whereby at the end of the power stroke the compressed charge is delivered through said piston to the cylinder, and one of the passages in the piston adapted to register with the inlet port from the carbureter at the end of the compression stroke whereby the explosive charge is delivered through said piston into the crank case for compression, and strengthening means augmenting the area in said chamber in the piston to increase radiation.

12. The combination of a crank case, a cylinder and piston, said piston having a chamber in its head affording thin upper and lower walls, ribs or pins integral with each wall, passages extending from said chamber and ported near the lower end of the piston, one of said passages adapted to communicate with the crank case at the limit of downward movement of the piston, a port in the side of the cylinder adapted to admit explosive mixture to one of the passages in the piston, a passage in the cylinder wall adapted to communicate with the other of said passages in the piston and with the crank case at one limit of movement of the piston, and to communicate with the same passage and the combustion chamber at the opposite limit of movement of said piston, the explosive mixture passing through all of said passages at the limits of movement of the piston.

13. In an engine the combination with a crank case, of a cylinder engaged thereto, a passage cored in one side of the cylinder and adapted at each end to open thereinto, a piston in said cylinder, said passage opening into the combustion chamber at one limit of movement of the piston, a chamber in the head of the piston, passages leading from said chamber on diametrically opposite sides and opening through the piston, one of said passages communicating with opposite ends of said passage in the cylinder at different limits of movement of the piston, a port in the cylinder adapted to register with the other passage at one limit of movement of the piston and to admit the explosive mixture thereinto and means affording communication between the last named passage and crank case at the opposite limit of movement of said piston.

14. In an engine the combination with a casing adapted for initial compression, of a cylinder engaged thereto, a reciprocating piston in said cylinder, a chamber in the head of said piston, passages leading from the chamber and opening through the sides of the piston, a passage cored in one side of the cylinder adapted at each end to communicate with one of the passages in the piston as the latter assumes different positions, said passage in the cylinder adapted also to communicate with the combustion chamber when the piston reaches one limit of its movement, a port opening into said cylinder adapted to communicate with the other of said passages at one limit of movement of the piston and a port opening from the crank case into the last named passage at the lower limit of movement of the piston.

15. In an engine the combination with a crank casing adapted for initial compression of a cylinder engaged thereto, a passage on one side of the cylinder adapted to open at each end into the same, and also to communicate with the combustion chamber when the piston is at one limit of its movement, a piston in said cylinder having a chamber in the head thereof, passages leading downwardly from said chamber on diametrically opposite sides of the piston and ported through the lower sides of the same, one of said passages adapted to communicate with the passage in the cylinder, an inlet port opening through the cylinder adapted to communicate with the other of said passages in the piston to permit the combustible mixture to flow through the piston and passage in the cylinder to the crank case at one limit of movement, and the last named of said passages in the piston communicating with the crank case at the opposite limit of movement of the piston, and the other passage in the piston communicating with the opposite end of the cylinder passage, permitting the combustible mixture to reverse its flow into the cylinder prior to compression therein.

In testimony whereof I have hereunto subscribed my name in the presence of two subscribing witnesses.

JOHN D. HAY.

Witnesses:
 GEO. W. MARBLE,
 C. W. HILLS.